United States Patent
Toyoshima

(10) Patent No.: US 7,648,269 B2
(45) Date of Patent: Jan. 19, 2010

(54) TEMPERATURE MEASURING DEVICE FOR SEMICONDUCTOR MANUFACTURING APPARATUS, METHOD OF MEASURING TEMPERATURE IN SEMICONDUCTOR MANUFACTURING APPARATUS, AND SEMICONDUCTOR MANUFACTURING APPARATUS

(75) Inventor: Yoshitaka Toyoshima, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 173 days.

(21) Appl. No.: 11/808,037

(22) Filed: Jun. 6, 2007

(65) Prior Publication Data

US 2007/0286255 A1    Dec. 13, 2007

(30) Foreign Application Priority Data

Jun. 7, 2006 (JP) .............................. 2006-158024

(51) Int. Cl.
*G01K 7/00* (2006.01)
*G01K 13/00* (2006.01)
(52) U.S. Cl. .................. 374/141; 374/179; 374/208; 374/110
(58) Field of Classification Search ................ 374/141, 374/163, 179, 121, 208
See application file for complete search history.

(56) References Cited

U.S. PATENT DOCUMENTS

| 6,676,289 B2 * | 1/2004 | Hirano et al. ............... 374/141 |
| 2003/0016116 A1 * | 1/2003 | Blaha ........................... 338/2 |
| 2003/0173635 A1 * | 9/2003 | Akram et al. ................ 257/467 |

FOREIGN PATENT DOCUMENTS

| JP | 62-139339 A | 6/1987 |
| JP | 11-118616 A | 4/1999 |
| JP | 2002-016117 A | 1/2002 |

* cited by examiner

*Primary Examiner*—Gail Verbitsky
*Assistant Examiner*—Mirellys Jagan
(74) *Attorney, Agent, or Firm*—Westerman, Hattori, Daniels & Adrian, LLP

(57) ABSTRACT

A temperature measuring device is configured of a substrate formed of a silicon wafer, a thermocouple formed by using the film forming method, the photolithographic method, and the etching method, and a clamp pad (an electrode pad) which is arranged in an edge portion of the substrate, and which is connected to the thermocouple. In a semiconductor manufacturing apparatus, the temperature measuring device is fixed on a wafer mounting portion with a clamper pin (a fastening device) being in contact with the clamp pad. An output of the thermocouple is taken out to the outside through the clamper pin.

16 Claims, 6 Drawing Sheets

TEMPERATURE MEASURING DEVICE FOR SEMICONDUCTOR MANUFACTURING APPARATUS, METHOD OF MEASURING TEMPERATURE IN SEMICONDUCTOR MANUFACTURING APPARATUS, AND SEMICONDUCTOR MANUFACTURING APPARATUS

CROSS-REFERENCE TO RELATED APPLICATIONS

This application is based on and claims priority of Japanese Patent Application No. 2006-158024 filed on Jun. 7, 2006, the entire contents of which are incorporated herein by reference.

BACKGROUND OF THE INVENTION

1. Field of the Invention

It is related to a temperature measuring device for a semiconductor manufacturing apparatus, which measures the temperature of a semiconductor wafer in a process of manufacturing a semiconductor device (an LSI: a large scale integrated circuit); a method of measuring temperature, by using the temperature measuring device, in the semiconductor manufacturing apparatus; and a semiconductor manufacturing apparatus which measures temperature by using the temperature measuring device.

2. Description of the Prior Art

In processing for manufacturing a semiconductor device (an LSI), there are a number of processes for heating a semiconductor wafer, such as a film forming process, an impurity diffusion process and an etching process. In these processes, the temperature of the wafer needs to be strictly managed. For example, in the chemical vapor deposition (CVD) process at the time of forming a film, large unevenness is caused in the film thickness if the temperature of the wafer is not strictly managed. In addition, in the etching process at the time of forming a wiring, a defect, such as an increase in the wiring resistance, a short circuit, or disconnection, is caused if the temperature of the wafer is not strictly managed.

In a case of a heating furnace, and a film forming apparatus such as a CVD apparatus used in the impurity diffusion process, the temperature is managed by monitoring the temperature in the apparatus, by use of a thermocouple arranged in the apparatus. However, in an apparatus of this kind, temperature on a wafer surface is not directly measured. For this reason, the temperature is not managed at a sufficiently strict level. In addition, the thermocouple arranged in the apparatus cannot measure the distribution of the temperature on the wafer surface.

In a single wafer apparatus used in the etching process or the physical vapor deposition (PVD) process, the ultimate temperature on a wafer surface is measured by attaching, to the wafer surface, a film, such as TEMP-PLATE (registered trademark), including an element which changes the color thereof according to the temperature. In the case of the temperature measurement using TEMP-Plate, it is possible to determine whether or not the ultimate temperature reaches a desired temperature, but not to know the temporal change in the temperature.

In order to solve such a problem, Publications of Japanese Patent Applications No. Sho 62-139339 (Patent Literature 1), No. Hei 11-118616 (Patent Literature 2), and No. 2002-16117 (Patent Literature 3) disclose that a thermocouple is formed on a semiconductor wafer, and that the temperature on a wafer surface is measured by the thermocouple.

Patent Literature 1 discloses that the thermocouple is formed on the wafer, but does not disclose how an output of the thermocouple is connected to a measuring device (a measuring circuit). A method may be employed in which one end of a cable of the measuring device is directly connected to an electrode on the wafer. This method, however, has a disadvantage that it is troublesome to connect the cable and to remove the cable after use. In addition, when the wafer is placed inside a vacuum chamber, it is difficult to take out the other end of the cable to the outside of the chamber.

Patent Literature 2 discloses that a thermocouple formed on a wafer and an external measuring device are connected to each other via a connector. In this case, however, an operator needs to attach or detach the connector, and this is also troublesome. As in the case of Patent Literature 1, a wafer is placed in a vacuum chamber, this method also has a disadvantage that it is difficult to take out one end of a cable to the outside of the chamber.

Patent Literature 3 discloses that an output of a thermocouple is taken out to the outside via an electrode pad provided in an edge portion (a vicinity of an orientation flat) of the wafer. However, Patent Literature 3 does not disclose how the electrode pad is connected to the measurement instrument.

In general, a semiconductor wafer is conveyed to a semiconductor manufacturing apparatuses (such as a film forming apparatus, an etching apparatus, and a heating furnace), and is set in a predetermined position by an automatic conveyor device. For this reason, there is a demand for a temperature measuring device which is conveyed and automatically set in semiconductor manufacturing apparatuses in a manner similar to that of a normal semiconductor wafer, and which can measure the temperature under a condition similar to a condition where the wafer is actually processed.

SUMMARY OF THE INVENTION

In consideration of the above background, an object is to provide a temperature measuring device for a semiconductor manufacturing apparatus which can be conveyed by an automatic conveyor device in a manner similar to that of a normal semiconductor wafer, and which can easily and precisely measure the temperature at the time of processing the semiconductor wafer; a method of measuring the temperature by using the temperature measuring device in the semiconductor manufacturing apparatus; and the semiconductor manufacturing apparatus which measures the temperature by using the temperature measuring device.

According to one aspect, a temperature measuring device for a semiconductor manufacturing apparatus is provided, having the following feature. The temperature measuring device is fixed to a predetermined position in a semiconductor manufacturing apparatus, and measures the temperature when the semiconductor manufacturing apparatus is in operation. The temperature measuring device includes a substrate, one or a plurality of temperature sensors formed on the substrate, and an electrode pad which is arranged in an edge portion of the substrate, and which is electrically connected to the temperature sensor. In the temperature measuring device, the electrode pad is arranged in a position where the electrode pad is in contact with a fastening device provided to the semiconductor manufacturing apparatus. An output of the temperature sensor is taken out to the outside from the electrode pad via the fastening device.

The temperature measuring device is fixed to the predetermined position in the semiconductor (LSI) manufacturing apparatus by a fastening device provided to the semiconductor manufacturing apparatus. An output of the temperature sensor provided to the temperature measuring device is taken out to the outside from the electrode pad provided to the edge portion of the temperature measuring device via the fastening device of the semiconductor manufacturing apparatus. In other words, in the case of the temperature measuring device of the present invention, an operator does not need to connect a cable, or to connect a connector at the time of measuring the temperature. Thus, the temperature measuring device can be automatically loaded or unloaded. This makes it easier to measure the temperature in the semiconductor manufacturing apparatus than otherwise.

As the substrate which constitutes the temperature measuring device, it is preferable that a semiconductor wafer having the same size as that of a semiconductor wafer actually used for manufacturing an LSI be used. By using such a semiconductor wafer, the temperature (or the temporal change of the temperature) on the wafer surface at the time of processing the semiconductor wafer can be precisely measured. In addition, it is made possible to measure temperature distribution (or the temporal change in the temperature distribution) by arranging a plurality of temperature sensors on the surface of the temperature measuring device.

According to another aspect, a method of measuring temperature in the semiconductor manufacturing apparatus is provided. In the method, a temperature measuring device, which has a temperature sensor, is mounted on a wafer mounting portion of the semiconductor manufacturing apparatus. The temperature measuring device is fixed on the wafer mounting portion with a fastening device provided to the semiconductor manufacturing apparatus, and an output of the temperature sensor is taken out to the outside of the temperature measuring device via the fastening device to measure temperature.

The temperature measuring device is fixed on the wafer mounting portion with the fastening device of the semiconductor manufacturing apparatus, and an output of the temperature sensor provided to the temperature measuring device is taken out to the outside via the fastening device. Accordingly, an operator does not need to connect the cable, or to connect the connector, at the time of measuring temperature. Thus, the temperature measuring device can be loaded or unloaded automatically. This makes it easier to measure the temperature in the semiconductor manufacturing apparatus than otherwise, and a time required for measuring temperature can be significantly shortened as compared with a time required for a conventional case.

According to still another aspect, a semiconductor manufacturing apparatus used for manufacturing a semiconductor device is provided. The semiconductor manufacturing apparatus includes a wafer mounting portion on which a semiconductor wafer is mounted; a fastening device which fixes a temperature measuring device provided with a temperature sensor, on the wafer mounting portion; and a wiring which is connected to the fastening device, and which takes out an output of the temperature sensor to the outside.

The semiconductor manufacturing apparatus is provided with the fastening device for fixing the temperature measuring device which is provided with the temperature sensor, on the wafer mounting portion. Moreover, the apparatus is configured in a way that an output of the temperature sensor of the temperature measuring device is taken out to the outside via the fastening device. Accordingly, an operator does not need to connect the cable, or to connect the connector at the time of measuring temperature, and it is made possible to automatically measure the temperature. As a result, the temperature in the semiconductor manufacturing apparatus can be measured easily, and a time required for measuring the temperature can be significantly shortened as compared with a time required for a conventional case.

DESCRIPTION OF THE PREFERRED EMBODIMENT

Descriptions will be provided below by referring to the accompanying drawings.

(Temperature Measuring Device)

Figure 1:
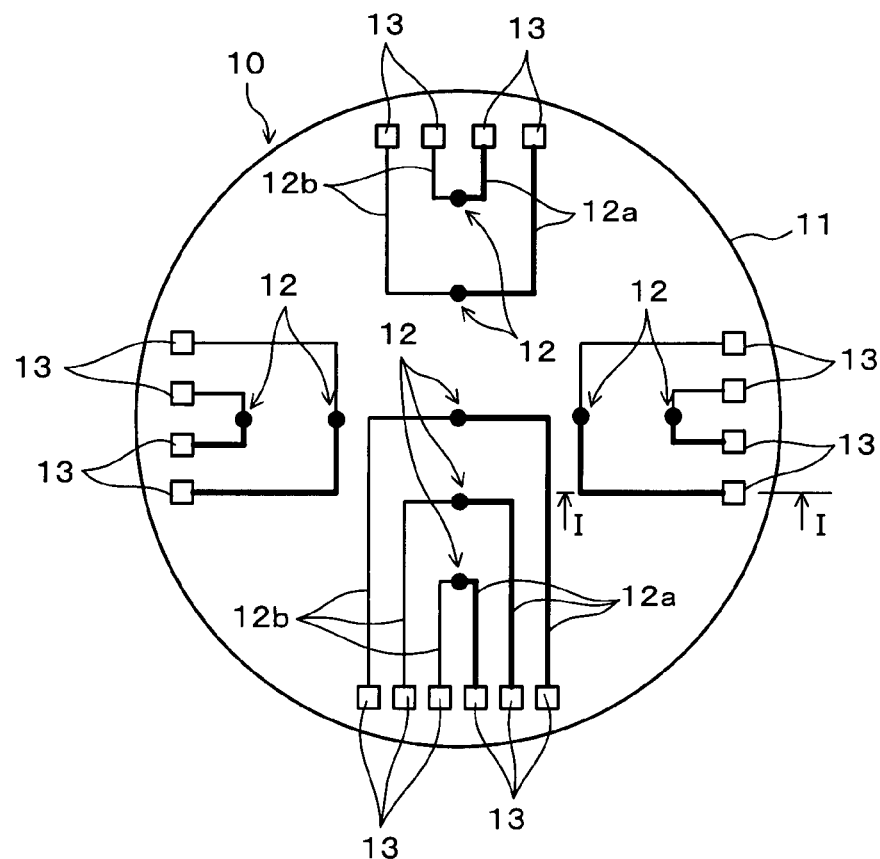
FIG. 1 is a schematic plan view showing a temperature measuring device for a semiconductor manufacturing apparatus according to an embodiment of the present invention.
Figure 2:
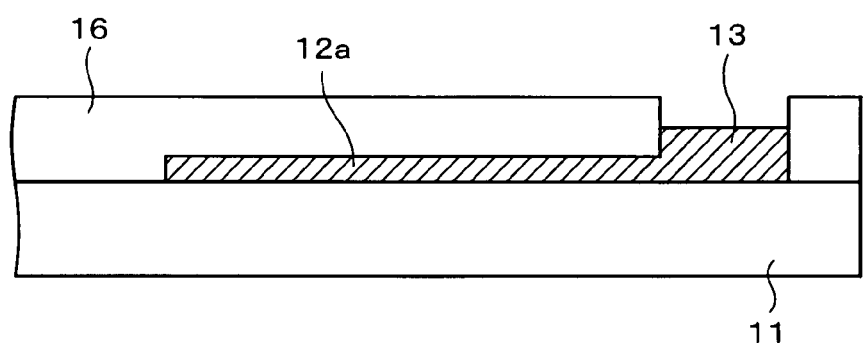
FIG. 2 is a schematic cross-sectional view of a position shown by the I-I line in FIG. 1.

FIG. 1 is a schematic plan view showing a temperature measuring device for a semiconductor manufacturing apparatus according to an embodiment. FIG. 2 is a schematic cross-sectional view in a position shown by the I-I line in FIG. 1.

A temperature measuring device 10 for a semiconductor manufacturing apparatus according to the present embodiment is configured of a substrate 11 and a plurality of thermocouples (temperature sensors) 12 formed on the substrate 11. Each of these thermocouples 12 are formed in such a manner that one of tip ends of each of two metal wires 12a and 12b are jointed together, the materials of the respective metal wires 12a and 12b being mutually different. Each of portions (shown by black dots in FIG. 1) where the metal wires 12a and 12b are joined together is termed as a temperature measuring junction where a voltage corresponding to a temperature is generated.

Examples of a combination of the metal wires 12a and 12b which constitutes the thermocouple 12 include those of copper and Constantin (alloy essentially containing copper and nickel), platinum and platinum-rhodium (alloy containing rhodium and platinum), Chromel (alloy essentially containing nickel and chrome)-Alumel (alloy essentially containing nickel), and the like. For each of the thermocouple 12 used in the present embodiment, one metal wire 12a is formed of platinum, and the other metal wire 12b is formed of platinum-rhodium. Each of end portions of the respective thermocouples 12 is connected to a corresponding one of clamp pads (electrode pads) 13 arranged in vicinities respectively of edge portions of the substrate 11.

A surface protection layer 16 is formed on the substrate 11, and the thermocouple 12 is covered with the surface protection layer 16. The surface protection layer 16 is formed of an insulator such as PSG (silicon oxide to which phosphors is doped) or polyimide. For example, in a case of a temperature measuring device 10 used for managing the temperature in a heat treatment process and a film forming process, it is preferable that a surface protection layer 16 be formed of PSG. In addition, for example, in a case of a temperature measuring device 10 used for managing the temperature in an etching process and an aluminum wiring forming process, it is preferable that a surface protection layer 16 be formed of polyimide. Incidentally, a size of the temperature measuring device 10 of the present embodiment is set to be the same size as that of a semiconductor wafer actually used for manufacturing an LSI.

As will be described below, the temperature measuring device 10 of the present embodiment is fixed on a stage (a wafer mounting portion) in such a manner that a clamper pin (a fastening device) of a semiconductor manufacturing apparatus is in contact with the clamp pads 13. Then, the thermocouples 12 formed on the substrate 11 are electrically connected to a measuring device (a measuring circuit) via the clamper pin of the semiconductor manufacturing apparatus.

The temperature measuring device 10 according to the present embodiment is manufactured by using a film forming technique, a photolithography technique, and an etching technique. FIGS. 3A to 3D are cross-sectional views showing, in order of processes, a method of manufacturing the temperature measuring device according to the present embodiment. Note that FIGS. 3A to 3D show cross-sections respectively at the temperature measuring junctions.

Figure 3A:
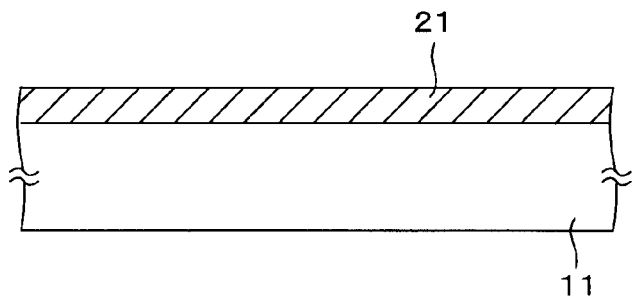
FIGS. 3A to 3D are cross-sectional views showing, in order of processes, an example of a method of manufacturing the temperature measuring device according to an embodiment.

Firstly, a process of forming a configuration shown in FIG. 3A will be described. A substrate 11 is initially prepared. As the substrate 11, it is preferable that a semiconductor wafer actually used for manufacturing an LSI be used. In this event, as a substrate 11, a silicon wafer is used. Next, an insulator film (not shown) is formed on the substrate 11. This insulator film is formed by, for example, the CVD method in such a manner that silicon oxide, silicon nitride or the like is deposited on the substrate 11. After that, platinum is spattered on an entire surface of an upper side of the substrate 11 to form a platinum film 21.

Figure 3B:
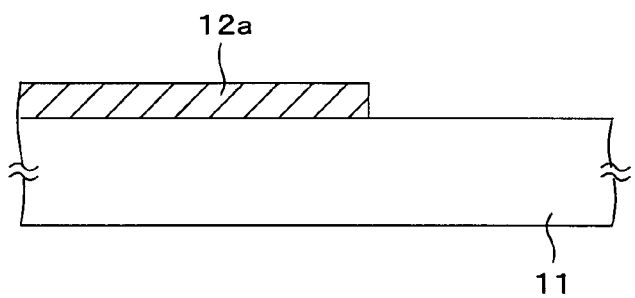

Subsequently, a process of forming a configuration shown in FIG. 3B will be described. As described above, the platinum film 21 is formed on the substrate 11. Thereafter, a photoresist film (not shown) is formed on the platinum film 21. After that, exposure and development processing are carried out, and the photoresist film is formed in a predetermined shape by patterning. The platinum film 21 is then etched by using the photoresist film as a mask, and one metal wire 12a constituting the thermocouple 12 and a clamp pad 13 (see FIG. 1) connected to the metal wire 12a are formed. Subsequently, the photoresist film used for forming the metal wire 12a and the clamp pad 13 is removed.

Figure 3C:
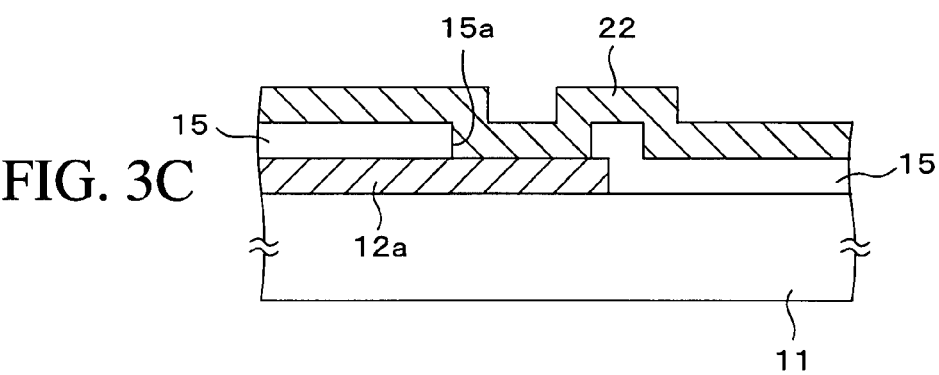

Next, a process of forming a configuration shown in FIG. 3C will be described. As described above, the metal wire 12a and the clamp pad 13 are formed. Thereafter, an insulator film 15 formed of, for example, silicon oxide or of silicon nitride is formed on the entire surface of the upper side of the substrate 11. Then, a portion of the insulator film 15 to be the temperature measuring junction is removed by the etching method, and an aperture 15a in which a tip end portion of the metal wire 12a is exposed is formed. Thereafter, the platinum rhodium is spattered on the entire surface of the upper side of the substrate 11 to form a platinum rhodium film 22. The platinum rhodium film 22 is joined to the tip end portion of the metal wire 12a through the aperture 15a of the insulator film 15. The junction portion of the platinum rhodium film 22 and the metal wire 12a is to be the temperature measuring junction of the thermocouple 12.

Figure 3D:
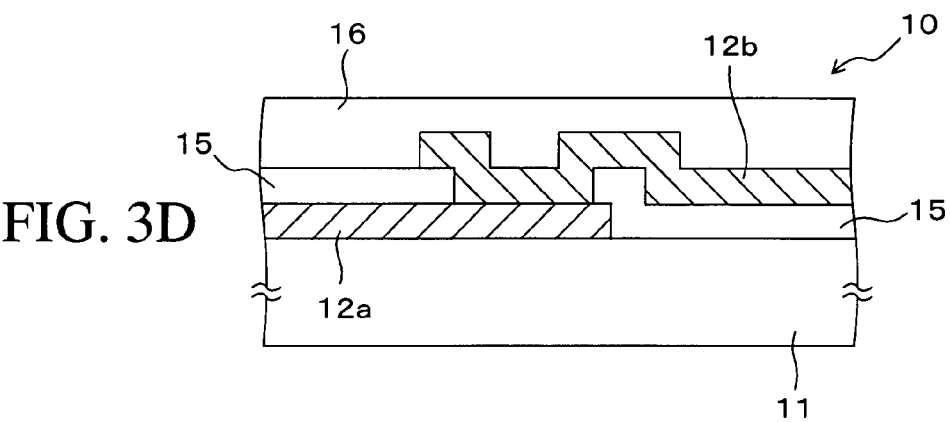

Next, a process of forming a configuration shown in FIG. 3D will be described. As described above, the platinum rhodium film 22 is formed. Thereafter, a photoresist film (not shown) is formed on the platinum rhodium film 22. Then, exposure and development processing are carried out, and the photoresist film is formed in a predetermined shape by patterning. After that, the platinum rhodium film 22 is etched by using the photoresist film as a mask, and the other metal wire 12b constituting the thermocouple 12 and the clamp pad 13 (see FIG. 1) connected to the metal wire 12b are formed. Subsequently, the photoresist film used for forming the metal wire 12b and the clamp pad 13 is removed.

Thereafter, a surface protection film 16 formed of, for example, PSG is formed on the entire surface of the upper side of the substrate 11 to cover the thermocouple 12. As described above, the surface protection film 16 may be formed of polyimide. After that, the surface protection film 16 on the clamp pad 13 is removed by etching, and the clamp pad 13 is exposed. Accordingly, the temperature measuring device 10 of the present embodiment is complete.

Incidentally, the metal wires 12a and 12b constituting the thermocouple 12 may be formed by the lift-off method. FIGS. 4A to 4D are cross-sectional views showing, in order of processes, a method of manufacturing the temperature measuring device 10 by the lift-off method.

Figure 4A:
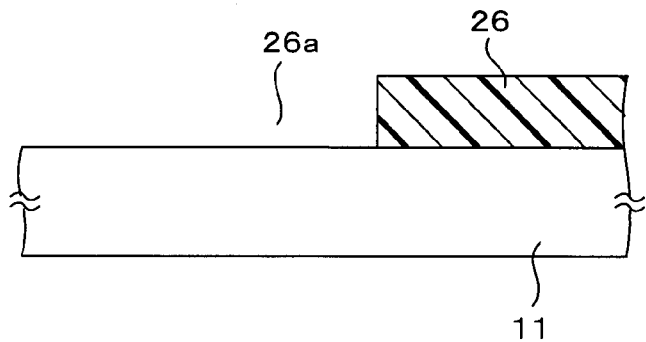
FIGS. 4A to 4D are cross-sectional views showing, in order of processes, another example of a method of manufacturing the temperature measuring device according to an embodiment.

Firstly, a process of forming a configuration showing in FIG. 4A will be described. An insulating film (not shown) formed of, for example, silicon oxide or silicon nitride is formed on the substrate 11. Thereafter, a photoresist film 26 is formed on an entire surface of an upper side of the substrate 11. Subsequently, the photoresist film 26 is exposed and developed to form an aperture 26a of a predetermined pattern.

Figure 4B:
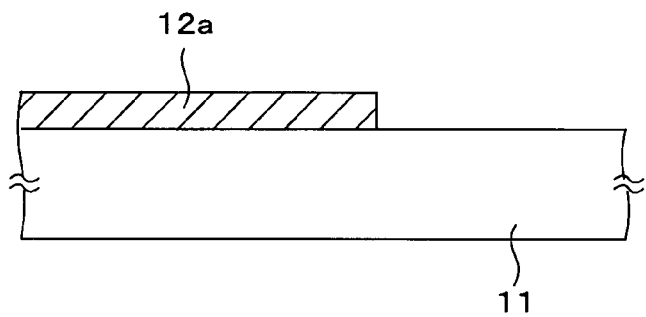

Next, a process of forming a configuration shown in FIG. 4B will be described. As described above, the aperture 26a is formed in the photoresist film 26. Thereafter, a platinum film is formed by spattering platinum on an entire surface of an upper side of the substrate 11. Subsequently, the photoresist film 26 is removed together with the platinum film thereon. Accordingly, the platinum film is left in a portion of the aperture 26a in the photoresist film 26. Thus, one metal wire 12a constituting the thermocouple 12 and the clamp pad 13 (see FIG. 1) connected to the metal wire 12a are formed.

Figure 4C:
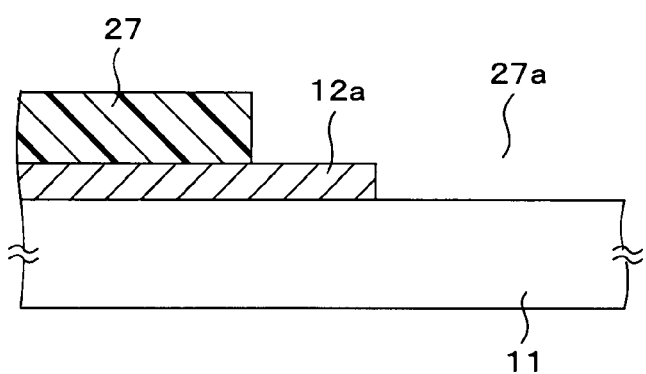

Next, a process of forming a configuration shown in FIG. 4C will be described. As described above, the metal wire 12a and the clamp pad 13 connected to the metal wire 12a are formed. Thereafter, a photoresist film 27 is formed on an entire surface of an upper side of the substrate 11. After that, the photoresist film 27 is exposed and developed to form an aperture 27a of a predetermined pattern.

Figure 4D:
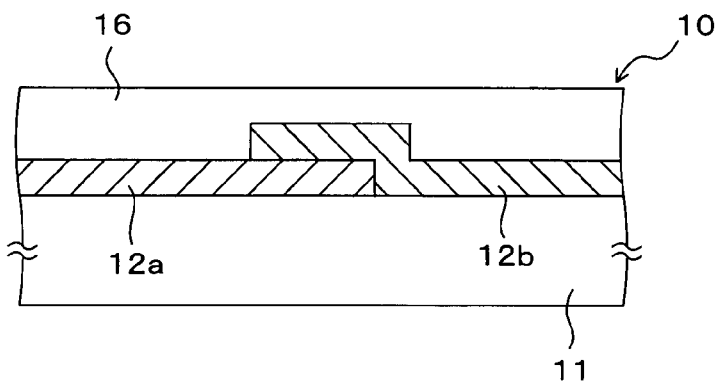

Next, a process of forming a configuration shown in FIG. 4D will be described. As described above, the aperture 27a is formed in the photoresist film 27. Thereafter, platinum rhodium is spattered on the entire surface of the upper side of the substrate 11 to form a platinum rhodium film. After that, the photoresist film 27 is removed together with the platinum rhodium film thereon. Accordingly, the platinum rhodium film is left in a portion of the aperture 27a. Thus, the other metal wire 12b constituting the thermocouple 12 and the clamp pad 13 (see FIG. 1) connected to the metal wire 12b are formed.

Subsequently, a surface protection layer 16 formed of, for example, PSG is formed on an entire surface of an upper side of the substrate 11. Thereby, the thermocouple 12 is covered with the surface protection layer 16. The surface protection layer 16 may be formed of polyimide. After that, the surface protection layer 16 on the clamp pad 13 is removed by etching to expose the clamp pad 13. Accordingly, the temperature measuring device 10 of the present embodiment is complete.

(Semiconductor Manufacturing Apparatus)

Figure 5:
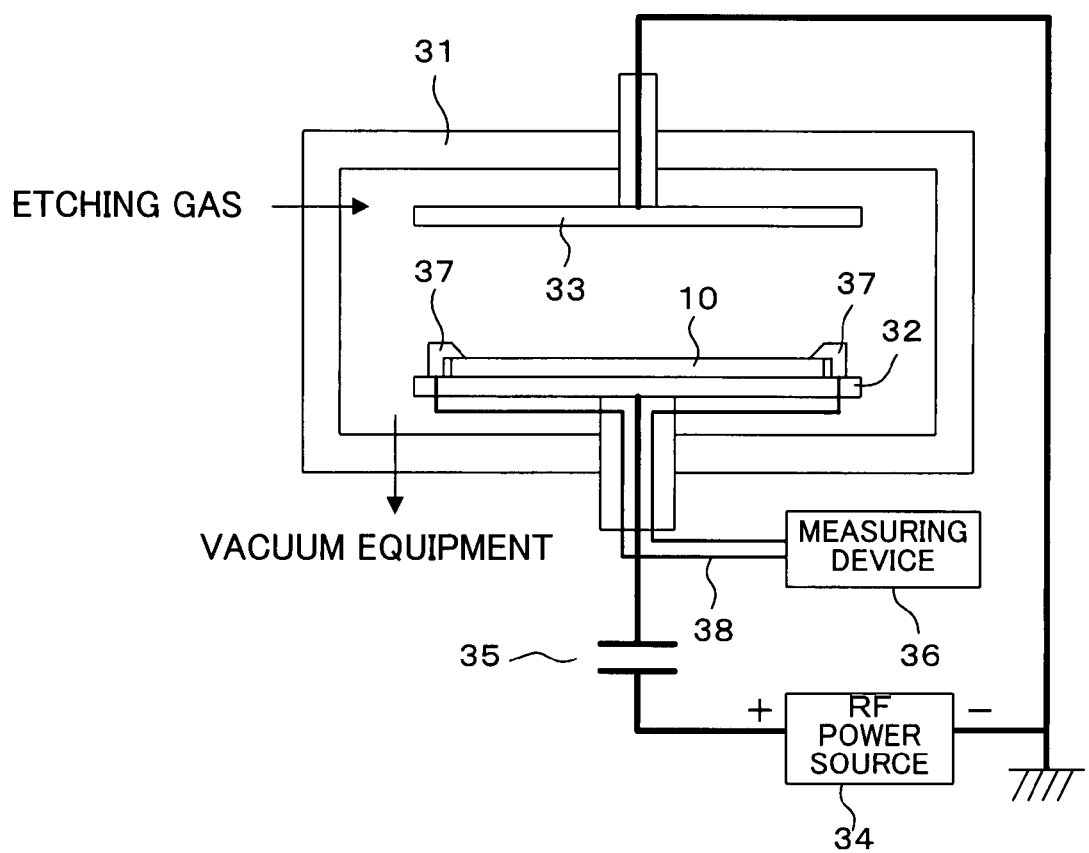
FIG. 5 is a schematic view showing an example of a semiconductor manufacturing apparatus according to an embodiment of the present invention.

FIG. 5 is a schematic view showing a semiconductor manufacturing apparatus which manages the temperature at the time of processing a semiconductor wafer, by using the above-described temperature measuring device 10. In this event, an example in which the present invention is applied to RIE (Reactive Ion Etching) apparatus will be described.

The RIE apparatus includes a vacuum chamber 31, an electrode stage (a wafer mounting portion) 32 arranged in the camber 31, an counter electrode 33 arranged above the electrode stage 32, a high-frequency power source 34 which generates high-frequency (RF) voltage, a blocking condenser 35 connected in-between the high-frequency power source 34 and the electrode stage 32, and a measuring device (a measuring circuit) 36 which is arranged outside of the chamber 31, and to which an output signal of the thermocouple 12 of the temperature measuring device 10 is inputted.

A space in the chamber 31 is connected to an etching gas supplying unit (not shown) and to a vacuum equipment (not shown). Etching gas is supplied from the etching gas supplying unit at the time of etching, and the inside of the chamber 31 is kept at a predetermined pressure by the vacuum equipment.

A semiconductor wafer is conveyed by an automatic conveyor device (not shown), and is mounted on the electrode stage 32. FIG. 5 shows a condition in which the temperature measuring device 10 with the configuration shown in FIG. 1 is mounted in place of a semiconductor wafer for manufacturing an LSI. The temperature measuring device 10 is fixed on the electrode stage 32 in such a manner that the clamper pin (the fastening device) 37 provided to the electrode stage 32 is in contact with the clamp pad 13 (see FIG. 1). In the RIE apparatus shown in FIG. 5, the counter electrode 33 is grounded, and a high-frequency voltage is applied to the electrode stage 32 from the high-frequency power source 34 via the blocking condenser 35.

When the semiconductor wafer is etched in the RIE apparatus configured as described above, the inside of the chamber 31 is kept at a constant pressure by the vacuum equipment, and the etching gas is supplied to the inside of the chamber 31. Moreover, a high-frequency voltage is applied to the electrode stage 32 from the high-frequency power source 34 via the blocking condenser 35. Accordingly, plasma is generated between the electrode stage 32 and the counter electrode 33. Ions in the plasma are vertically doped into the semiconductor wafer mounted on the electrode stage 32, and the anisotropic etching is carried out.

Figure 6A:
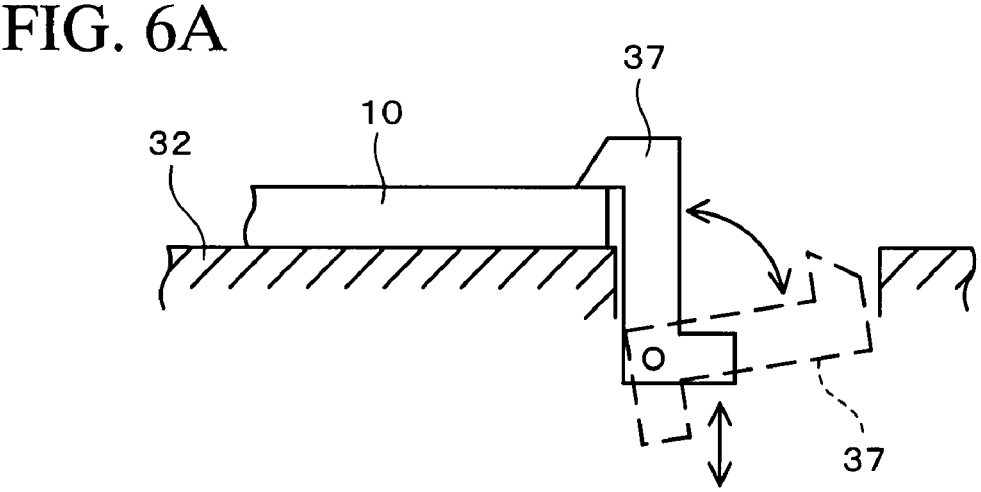
FIGS. 6A and 6B are both schematic views showing a motion of a clamper pin provided to an electrode stage.
Figure 6B:
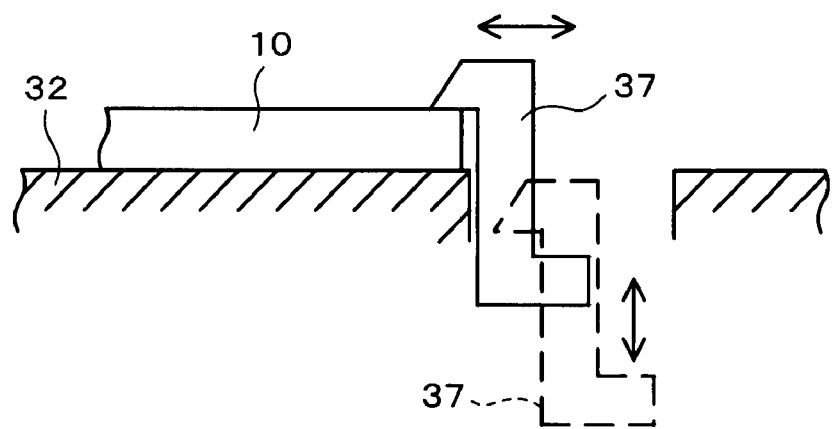

FIGS. 6A and 6B are both schematic views showing a motion of the clamper pin 37 provided to the electrode stage 32. For example, as shown by the arrows in FIGS. 6A and 6B, the clamper pin 37 is moved by a cylinder (not shown) provided to the electrode stage 32. That is, when the temperature measuring device 10 is loaded or unloaded, the clamper pin 37 is stored in the electrode stage 32 as shown by the broken lines in FIGS. 6A and 6B. When the temperature measuring device 10 is mounted on a predetermined position on the electrode stage 32, the clamper pin 37 is driven by the cylinder, and is moved to a position shown by the solid line in FIG. 6A or 6B. Thereby, the clamper pin 37 is caused to be in contact with the clamp pad 13 of the temperature measuring device 10. Accordingly, the temperature measuring device 10 is fixed on the electrode stage 32. The thermocouple 12 provided to the temperature measuring device 10 and the measuring device 36 arranged outside of the chamber 31 are electrically connected to each other via the clamper pin 37. It is to be noted that the clamp pad 13 and the measuring device 36 are connected to each other by a compensating lead wire 38 as shown in FIG. 5. The compensating lead wire 38 is formed of a metal having a thermoelectromotive force property equivalent to a metal constituting the thermocouple 12.

(Method of Measuring Temperature in Semiconductor Manufacturing Apparatus)

Figure 7:
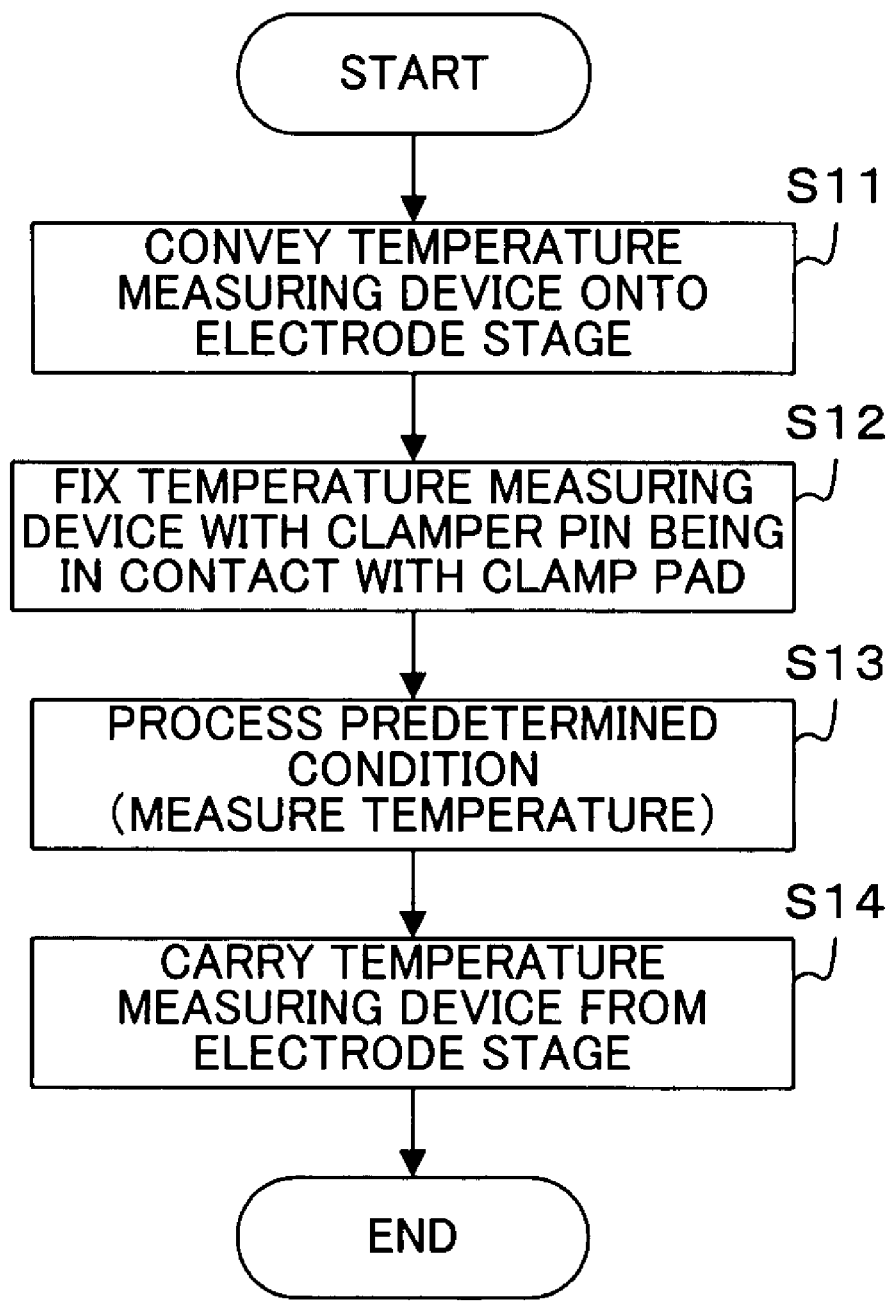
FIG. 7 is a flowchart showing a method of measuring temperature of the semiconductor manufacturing apparatus according to the present embodiment.

A method of measuring the temperature in the semiconductor manufacturing apparatus using the above-described temperature measuring device 10 will be described below by using the flowchart shown in FIG. 7.

Firstly, at step S11, the temperature measuring device 10 is conveyed onto the electrode stage 32 of the RIE apparatus by the automatic conveyor device as in a case of a normal semiconductor wafer for manufacturing an LSI.

Next, at step S12, the temperature measuring device 10 is fixed on the electrode stage 32 with the clamper pin 37. At this time, the clamper pin 37 is in contact with the clamp pad 13 of the temperature measuring device 10. Thereby, the thermocouple 12 provided to the temperature measuring device 10 and the measuring device 36 arranged outside of the chamber 31 are electrically connected to each other.

Subsequently, the step proceeds to step S13, the RIE apparatus is operated under the condition identical to that under which an LSI is actually manufactured. Thereafter, the temperature is measured with the measuring device 36 connected to the thermocouple 12 of the temperature measuring device 10. In this case, the surface temperature of the temperature measuring device 10, the temporal change in the surface temperature, the temperature distribution on the surface of the temperature measuring device 10, the temporal change in the temperature distribution, and the like can be measured.

Next, the step proceeds to step S14 when the temperature measurement is completed, and the temperature measuring device 10 is discharged from the electrode stage 32 by the automatic conveyor device.

In the present embodiment, the temperature is measured by using the temperature measuring device 10 having the same size as that of the semiconductor wafer used for manufacturing an LSI. Hence, the temperature in the semiconductor wafer at the time when an LSI is actually manufactured can be precisely measured. In addition, in the present embodiment, a plurality of thermocouples 12 are provided to the temperature measuring device 10. Thus, the temperature distribution on the wafer surface can be measured, and the temporal change in the temperature distribution can also be measured.

Furthermore, the temperature measuring device 10 of the present embodiment has the same size as that of the semiconductor wafer used for manufacturing an LSI. Hence, the temperature measuring device 10 can be conveyed by the automatic conveyor device used for manufacturing an LSI. Accordingly, the temperature measuring device 10 can be easily loaded to, and unloaded from, the semiconductor manufacturing apparatus, and the operating time can be made shorter. Even in a process where processing is continuously carried out by moving the semiconductor wafer in a vacuum or under reduced pressure, the temperature can be measured without stopping the apparatus.

Conventionally, in a case where it is necessary to measure temperature in the RIE apparatus in an actual manufacturing process, the following operations (1) to (11), for example, are needed:

(1) causing pressure in the inside of the chamber to be atmospheric pressure;

(2) mounting a temperature sensor on a wafer;

(3) connecting the temperature sensor to a measuring device;

(4) operating a vacuum equipment to cause the pressure inside the chamber to be a predetermined pressure;

(5) setting an etching condition;

(6) starting temperature measurement;

(7) returning the pressure inside of the chamber to be the atmospheric pressure after completing the temperature measurement;
(8) dismounting wiring between the temperature sensor and the measuring device;
(9) dismounting the temperature sensor from the wafer;
(10) vacuating the inside of the chamber; and
(11) restarting processing on products after daily management (such as particle check) is carried out.

Conventionally, it takes approximately three to six hours for the above operations. In contrast, the method of measuring the temperature according to the present embodiment, temperature measurement is completed in about ten minutes. That is, the method of measuring the temperature according to the present embodiment requires a time, when the manufacturing of products is suspended, considerably shorter than the conventional methods.

It is to be noted that, in the above-described embodiment, the descriptions have been provided for the case where the thermocouple is used as a temperature sensor. However, as a temperature sensor, for example, a thermistor or other sensors can be used. However, in order to cause the temperature measuring device to be the same size as that of the semiconductor wafer used for manufacturing an LSI, it is preferable that a temperature sensor which can be manufactured on a substrate with the film forming technique, the photolithography technique, and the etching technique, be used.

What is claimed is:

1. A temperature measuring device for a semiconductor manufacturing apparatus which is fixed to a predetermined position on a stage in a semiconductor manufacturing apparatus, and which measures temperature when the semiconductor manufacturing apparatus is in operation, the device comprising:
   a substrate;
   one or a plurality of temperature sensors formed on the substrate; and
   an electrode pad which is in an edge portion of the substrate, and which is electrically connected to the temperature sensor, the device wherein the electrode pad is arranged in a position where the electrode pad is in contact with a fastening device provided in the semiconductor manufacturing apparatus, and an output of the temperature sensor is taken out from the electrode pad to the outside through the fastening device, the fastening device being stored inside the stage in a given period.

2. The temperature measuring device for a semiconductor manufacturing apparatus according to claim 1, wherein a semiconductor wafer is used as the substrate.

3. A temperature measuring device for a semiconductor manufacturing apparatus according to claim 1, wherein the temperature sensor is formed by etching a metal film.

4. The temperature measuring device for a semiconductor manufacturing apparatus according to claim 1, wherein the temperature sensor is formed of a thermocouple.

5. The temperature measuring device for a semiconductor manufacturing apparatus according to claim 1, wherein an insulating surface protection layer covering the temperature sensor is formed on the substrate.

6. A temperature measuring device for a semiconductor manufacturing apparatus according to claim 1, wherein the given period is a period in which the temperature measuring device is loaded or unloaded into the semiconductor manufacturing apparatus.

7. A method of measuring temperature in a semiconductor manufacturing apparatus, comprising:
   mounting a temperature measuring device, which has a temperature sensor, on a wafer mounting portion in the semiconductor manufacturing apparatus;
   fixing the temperature measuring device on the wafer mounting portion with a fastening device provided to the semiconductor manufacturing apparatus, the fastening device being stored inside the wafer mounting portion in a given period; and
   taking out an output of the temperature sensor to the outside of the temperature measuring device via the fastening device.

8. The method of measuring temperature in a semiconductor manufacturing apparatus according to claim 7, wherein the given period is a period in which the temperature measuring device is loaded or unloaded into the semiconductor manufacturing apparatus.

9. The method of measuring temperature in a semiconductor manufacturing apparatus according to claim 7, wherein the temperature sensor is formed of a thermocouple.

10. The method of measuring temperature in a semiconductor manufacturing apparatus according to claim 9, wherein a compensating lead wire formed of a metal, which has a thermoelectromotive force property equivalent to a metal constituting the thermocouple, is used as a wiring for taking out an output of the thermocouple to the outside.

11. The method of measuring temperature in a semiconductor manufacturing apparatus according to claim 7, wherein the temperature measuring device is configured by a semiconductor wafer on which the temperature sensor is formed, and an electrode pad which is arranged in an edge portion of the semiconductor wafer, and which is electrically connected to the temperature sensor.

12. The method of measuring temperature in a semiconductor manufacturing apparatus according to claim 11, wherein the temperature measuring device is fixed with the fastening device being in contact with the electrode pad.

13. A semiconductor manufacturing apparatus used for manufacturing a semiconductor device, comprising:
   a wafer mounting portion on which a semiconductor wafer is mounted;
   a fastening device for fixing a temperature measuring device, which is provided with a temperature sensor, on the wafer mounting portion and for being stored inside the wafer mounting portion in a given period; and
   a wiring which is connected to the fastening device, and which is used for taking out an output of the temperature sensor to the outside.

14. The semiconductor manufacturing apparatus according to claim 13, wherein the temperature sensor is formed of a thermocouple, and a compensating lead wire, which is formed of a metal having a thermo electromotive force property equivalent to a metal constituting the thermocouple, is used.

15. The semiconductor manufacturing apparatus according to claim 13, further comprising a chamber which includes the wafer mounting portion therein, and which is connected to a vacuum equipment.

16. The semiconductor manufacturing apparatus according to claim 13, wherein the given period is a period in which the temperature measuring device is loaded or unloaded into the semiconductor manufacturing apparatus.

* * * * *